(12) United States Patent
Song

(10) Patent No.: US 11,837,737 B2
(45) Date of Patent: Dec. 5, 2023

(54) VEHICLE BODY MEMBER HAVING CHARGING AND DISCHARGING FUNCTION

(71) Applicants: Hyundai Motor Company, Seoul (KR); Kia Motors Corporation, Seoul (KR)

(72) Inventor: Won Ki Song, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 777 days.

(21) Appl. No.: 16/998,165

(22) Filed: Aug. 20, 2020

(65) Prior Publication Data
US 2021/0184193 A1    Jun. 17, 2021

(30) Foreign Application Priority Data
Dec. 13, 2019   (KR) .................. 10-2019-0167266

(51) Int. Cl.
*H01M 50/20*     (2021.01)
*H01M 10/42*     (2006.01)
(Continued)

(52) U.S. Cl.
CPC ............. *H01M 50/20* (2021.01); *B60L 50/64* (2019.02); *B62D 25/06* (2013.01);
(Continued)

(58) Field of Classification Search
CPC ...... H01M 50/20; H01M 50/51; H01M 50/46; H01M 50/249; H01M 50/289;
(Continued)

(56) References Cited

U.S. PATENT DOCUMENTS

2019/0305292 A1   10/2019  Hudak et al.
2023/0066278 A1*   3/2023  Mindte ................ H01M 4/583

FOREIGN PATENT DOCUMENTS

DE        102012214964 A1 *  3/2014  .......... H01M 2/0267
EP           2958178 A1     12/2015
(Continued)

OTHER PUBLICATIONS

EPO machine generated English translation of DE-102012214964-A1 (Year: 2014).*
(Continued)

*Primary Examiner* — Christopher P Domone
*Assistant Examiner* — Kimberly Wyluda
(74) *Attorney, Agent, or Firm* — Slater Matsil, LLP

(57) ABSTRACT

A vehicle body member includes a first cell portion including a first negative pole portion and a first positive pole portion, with one or more first via holes penetrating the first negative pole portion and the first positive pole portion, a second cell portion including a second negative pole portion and a second positive pole portion, an insulating layer disposed between a surface of the first cell portion and a surface of the second cell portion, the insulating layer having one or more insulating via holes, a series connector connecting the first negative pole portion and the second positive pole portion in series via the first via holes and the insulating via holes, a positive pole current collector connected to the first positive pole portion, and a negative pole current collector connected to the second negative pole portion.

19 Claims, 7 Drawing Sheets

(51) Int. Cl.
*H01M 10/44* (2006.01)
*H01M 10/46* (2006.01)
*H02J 7/00* (2006.01)
*H02J 7/14* (2006.01)
*H01M 50/46* (2021.01)
*H01M 50/51* (2021.01)
*B60L 50/64* (2019.01)
*H01M 4/583* (2010.01)
*H01M 50/249* (2021.01)
*H01M 50/264* (2021.01)
*H01M 50/289* (2021.01)
*H01M 50/24* (2021.01)
*H01M 50/502* (2021.01)
*B62D 25/06* (2006.01)

(52) U.S. Cl.
CPC ....... *H01M 10/425* (2013.01); *H01M 10/441* (2013.01); *H01M 10/46* (2013.01); *H01M 50/24* (2021.01); *H01M 50/46* (2021.01); *H01M 50/502* (2021.01); *H01M 50/51* (2021.01); *H02J 7/0068* (2013.01); *H02J 7/14* (2013.01); *H01M 4/583* (2013.01); *H01M 50/249* (2021.01); *H01M 50/264* (2021.01); *H01M 50/289* (2021.01); *H01M 2010/4271* (2013.01); *H01M 2220/20* (2013.01); *H01M 2300/0065* (2013.01)

(58) Field of Classification Search
CPC ............ H01M 50/264; H01M 10/425; H01M 10/441; H01M 10/46; H01M 4/583; H01M 2220/20; H01M 2300/0065; B60L 50/64; H02J 7/0068; H02J 7/14
See application file for complete search history.

(56) References Cited

FOREIGN PATENT DOCUMENTS

| | | | |
|---|---|---|---|
| KR | 101125362 B1 | 3/2012 | |
| KR | 20160014516 A | 2/2016 | |
| KR | 2016-0004737 A | * 12/2016 | .......... H01M 10/052 |

OTHER PUBLICATIONS

EPO machine generated English translation of KR-2016-0004737-A (Year: 2016).*

European Patent Office, Extended European Search Report dated Jan. 29, 2021.

* cited by examiner

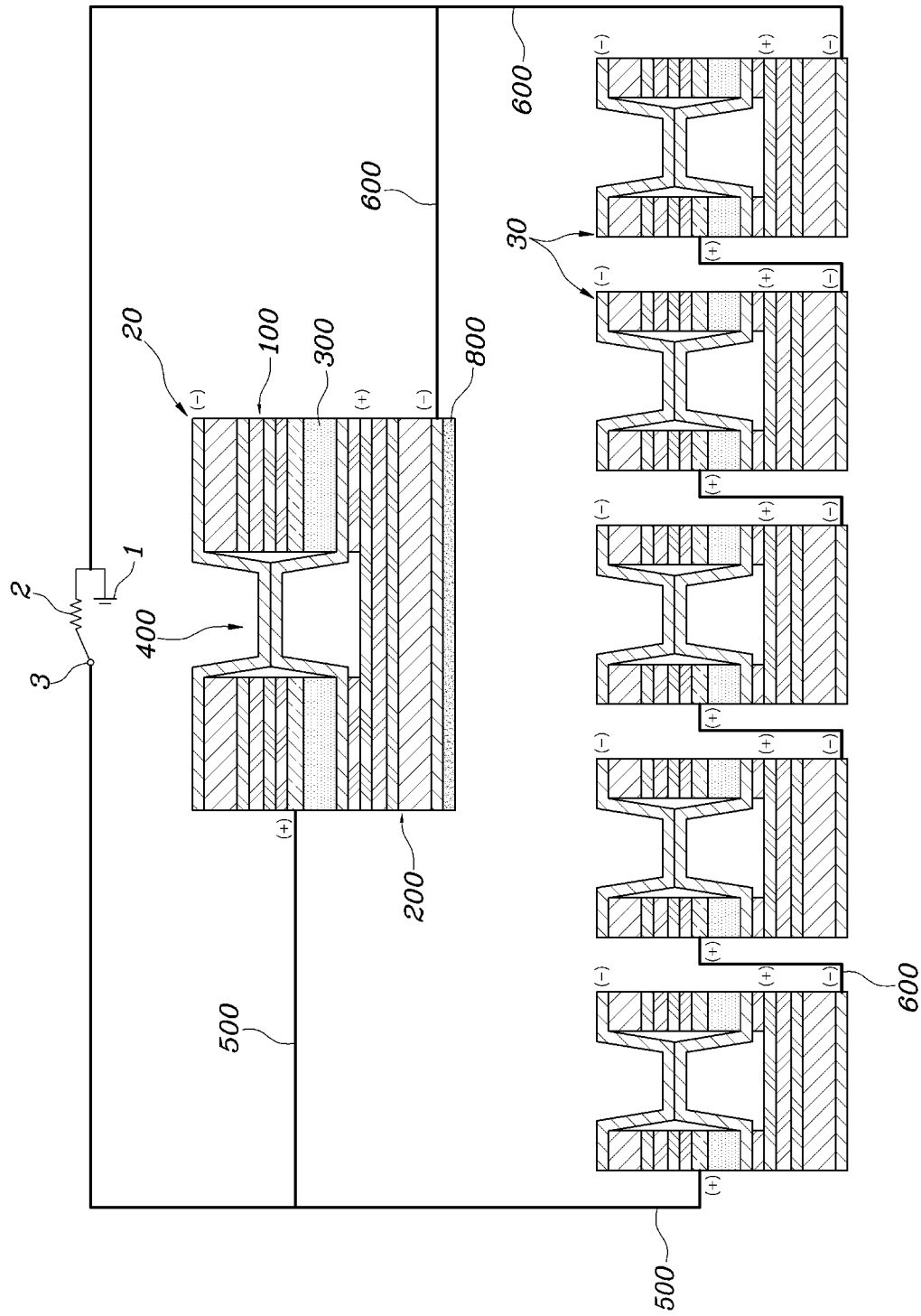

VEHICLE BODY MEMBER HAVING CHARGING AND DISCHARGING FUNCTION

CROSS-REFERENCE TO RELATED APPLICATIONS

This application claims priority to Korean Patent Application No. 10-2019-0167266, filed on Dec. 13, 2019, which application is hereby incorporated herein by reference.

TECHNICAL FIELD

The present invention relates generally to a vehicle body member having a charging and discharging function.

BACKGROUND

In the related art, body structures and a variety of components of a vehicle have been made of steel. Recently, composite materials, such as a fiber reinforced resin composite, are used in place of steel materials in order to improve fuel efficiency due to weight reduction.

In general, a fiber reinforced resin composite has a basic structure comprised of a reinforcing material handling or supporting a load applied to the composite and a base material serving to transfer the load applied to the composite to the reinforcing material while being combined with the reinforcing material to define an overall shape of the composite. In this case, the reinforcing material is generally a fibrous reinforcing material, such as carbon fiber, glass fiber, or aramid fiber, while the base material is generally a resin-type base material, such as a thermosetting resin or a thermoplastic resin. The thermosetting resin may be a phenol resin, an epoxy resin, or the like. The thermoplastic resin may be polyvinyl chloride (PVC), polyethylene (PE), polypropylene (PP), or the like.

In addition, among components of a vehicle, a significant number of components are electromagnetic components (or electromagnetic devices) operated by power supplied by a battery. Recently, due to an increasing number of electromagnetic components, research into solutions for increasing the capacity of a battery of a vehicle has continuously been undertaken.

Embodiments of the present invention take into consideration that carbon fiber used as a reinforcing material of a fiber reinforced resin composite can be used as a negative pole of a secondary cell. Accordingly, embodiments of the present invention provide a vehicle body member able to realize a charging and discharging function using a reinforcing material used to reduce the weight of a vehicle and to increase the strength of the vehicle.

The foregoing is intended merely to aid in the understanding of the background of the present invention, and is not intended to mean that the present invention falls within the purview of the related art that is already known to those skilled in the art.

SUMMARY

The present invention relates generally to a vehicle body member having a charging and discharging function. Particular embodiments relate to a vehicle body member able to realize a charging and discharging function using carbon fiber that has been used for weight reduction and reinforcement.

Embodiments of the present invention have been made keeping in mind problems occurring in the related art and provide a vehicle body member having a charging and discharging function, in which carbon fiber that has been used as a reinforcing member in each of a roof panel and roof rails of a vehicle body is used as a negative pole of a secondary cell.

According to one embodiment of the present invention, there is provided a vehicle body member having a charging and discharging function. The vehicle body member may include a first cell portion including a first negative pole portion made of carbon fiber and a first positive pole portion disposed to be in contact with one surface of the first negative pole portion, the first positive pole portion containing a cathode active material and a solid electrolyte, with one or more first via holes penetrating the first negative pole portion and the first positive pole portion, a second cell portion including a second negative pole portion made of carbon fiber and a second positive pole portion disposed to be in contact with the other surface of the second negative pole portion, the second positive pole portion containing a cathode active material and a solid electrolyte, an insulating layer disposed between one surface of the first cell portion and the other surface of the second cell portion to insulate the first cell portion and the second cell portion from each other, the insulating layer having one or more insulating via holes communicating with the first via holes provided in the first cell portion, a series connector connecting the first negative pole portion of the first cell portion and the second positive pole portion of the second cell portion in series via the first via holes and the insulating via holes, a positive pole current collector connected to the first positive pole portion of the first cell portion, and a negative pole current collector connected to the second negative pole portion of the second cell portion.

Each of the first negative pole portion and the second negative pole portion may be a stack of a plurality of reinforced fiber sheets, with carbon fibers thereof being arranged in different directions.

The first positive pole portion may include a first positive pole layer disposed opposite to one surface of the first negative pole portion, with the cathode active material being distributed in the first positive pole layer, and first solid electrolyte layers disposed between the first negative pole portion and the first positive pole layer to be in contact with the first negative pole portion and the first positive pole layer, respectively. The second positive pole portion may include a second positive pole layer disposed opposite to one surface of the second negative pole portion, with the cathode active material being distributed in the second positive pole layer, and second solid electrolyte layers disposed between the second negative pole portion and the second positive pole layer to be in contact with the second negative pole portion and the second positive pole layer, respectively. The first positive pole layer and the second positive pole layer may be insulated from each other by the insulating layer. The second positive pole layer and the first negative pole portion may be connected in series via the series connector.

The series connector may include a first series connector disposed to be in contact with the other surface of the first negative pole portion and bent to extend into the first via holes, and a second series connector disposed to be sandwiched between the insulating layer and the second positive pole layer and bent to extend into the insulating via holes and the first via holes to be in contact with the first series connector.

The second cell portion may have one or more second via holes penetrating predetermined regions of the second negative pole portion and the second positive pole portion, the second via holes being provided in locations communicating with locations in which the first via holes are provided.

A reinforcing member may be disposed in a portion or an entirety of each of the first via holes, the insulating via holes, and the second via holes.

The body member may be a plurality of vehicle body members. The positive pole current collectors of the vehicle body members may be connected in parallel. The negative pole current collectors of the vehicle body members may be connected in parallel. The positive pole current collectors and the negative pole current collectors may be selectively connected to an alternator or an electromagnetic device of a vehicle via a switch. A charging operation may be performed via the vehicle body members while the positive pole current collectors and the negative pole current collectors are electrically connected to the alternator of the vehicle. Power generated by a discharging operation performed via the vehicle body members may be connected to the electromagnetic device of the vehicle while the positive pole current collectors and the negative pole current collectors are electrically connected to the electromagnetic device of the vehicle.

The body member may be a plurality of vehicle body members. The positive pole current collectors respectively connected to a corresponding one of first positive pole layers of the vehicle body members may be connected in series to the negative pole current collectors respectively connected to a corresponding one of the second negative pole portions of the other vehicle body member, such that the positive pole current collectors are connected to each other in series. The positive pole current collector of a vehicle body member, disposed on one end of the vehicle body members connected in series, and the negative pole current collector of a vehicle body member, disposed on the other end of the vehicle body members connected in series, may be selectively connected to an alternator or an electromagnetic device of a vehicle via a switch. A charging operation may be performed via the vehicle body members while the positive pole current collectors and the negative pole current collectors are electrically connected to the alternator of the vehicle. Power generated by a discharging operation performed via the vehicle body members may be connected to the electromagnetic device of the vehicle while the positive pole current collectors and the negative pole current collectors are electrically connected to the electromagnetic device of the vehicle.

At least one vehicle body member of the plurality of vehicle body members may provide a roof panel of the vehicle, and the remaining vehicle body members may provide roof rails of the vehicle.

The vehicle body member providing the roof panel and the vehicle body members providing the roof rails may be insulated by an insulating member.

The first cell portion, the second cell portion, the insulating layer, and the series connector may be molded from a resin.

According to embodiments of the present invention, carbon fiber that has been used as a reinforcing member in each of a roof panel and roof rails of a vehicle body may be used as a negative pole of a secondary cell, and a means serving as a solid electrolyte and a positive pole may be disposed inside of the roof panel and the roof rails. Accordingly, each of the roof panel and the roof rails may advantageously serve as a secondary cell having a charging and discharging function.

In addition, each of the roof panel and the roof rails may be fabricated as a secondary cell having a charging and discharging function. The roof panel and the roof rails may be connected in series or in parallel to increase the output or the capacity of the secondary cell.

BRIEF DESCRIPTION OF THE DRAWINGS

The above and other objectives, features, and other advantages of the present invention will be more clearly understood from the following detailed description when taken in conjunction with the accompanying drawings, in which:

FIG. 4B is a parallel circuit diagram illustrating the vehicle body member having a charging and discharging function according to one embodiment of the present invention.

DETAILED DESCRIPTION OF ILLUSTRATIVE EMBODIMENTS

Figure 1:
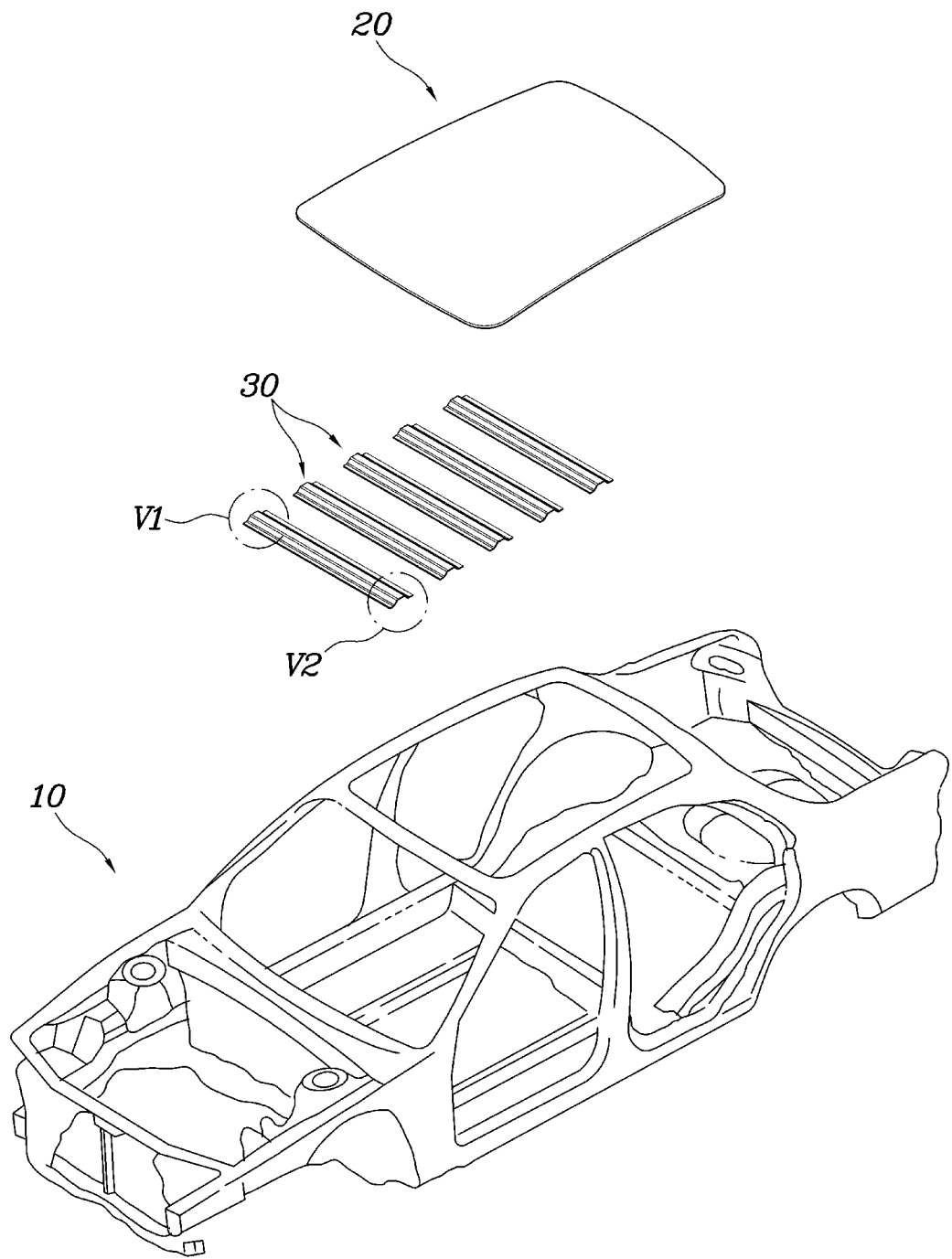
FIG. 1 is a perspective view illustrating a vehicle in which vehicle body members having a charging and discharging function according to one embodiment of the present invention are used.

Hereinafter, specific embodiments of the present invention will be described with reference to the drawings. The present invention may, however, be embodied in a variety of different forms and should not be construed to be limited to the embodiments set forth herein. Rather, these embodiments are provided so that this disclosure will be thorough and complete, and will fully convey the scope of the present invention to a person having ordinary knowledge in the art. In the drawings, the shapes and dimensions may be exaggerated for clarity.

Figure 2A:
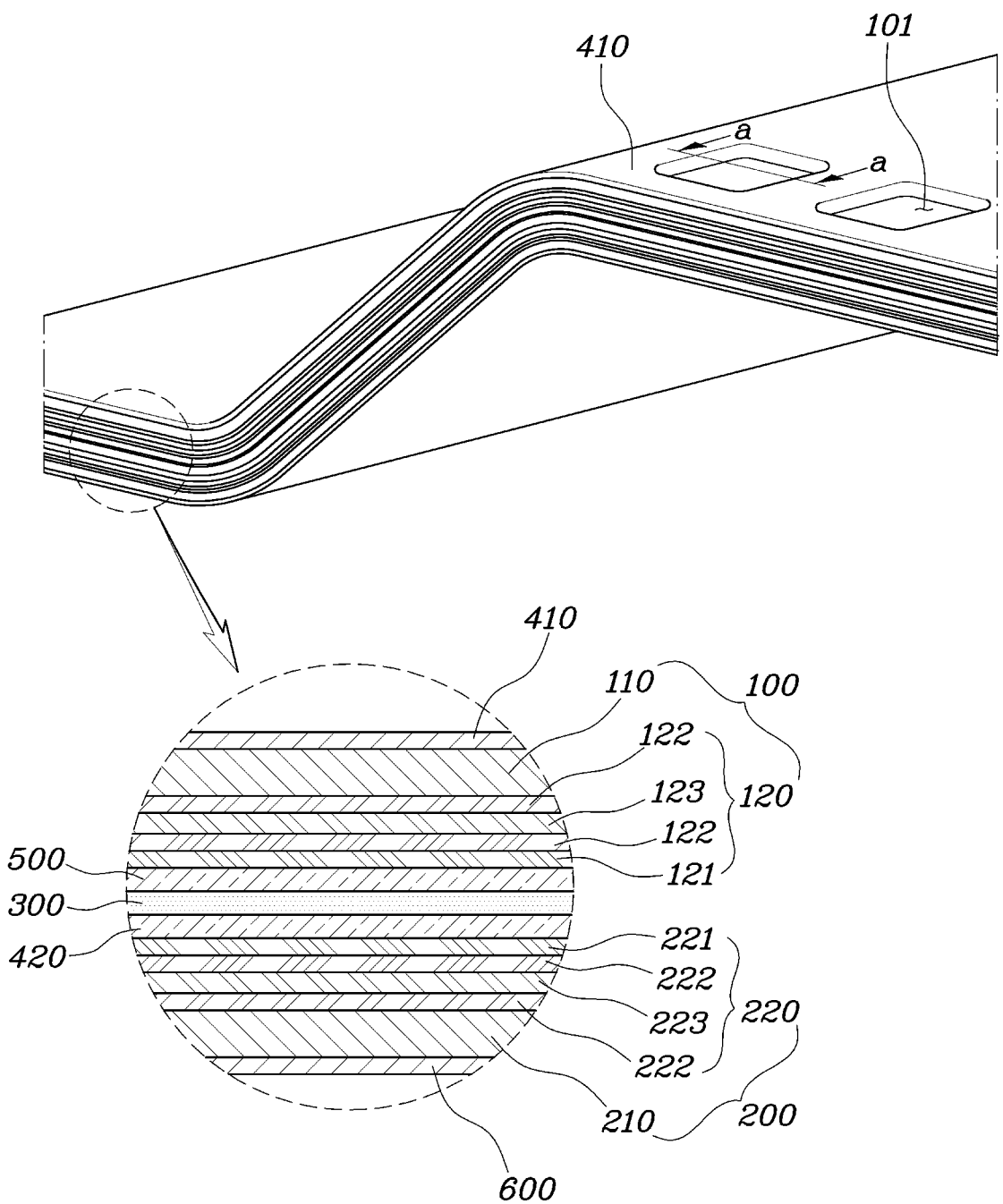
FIGS. 2A and 2B are enlarged views illustrating key portions of FIG. 1.
Figure 2B:
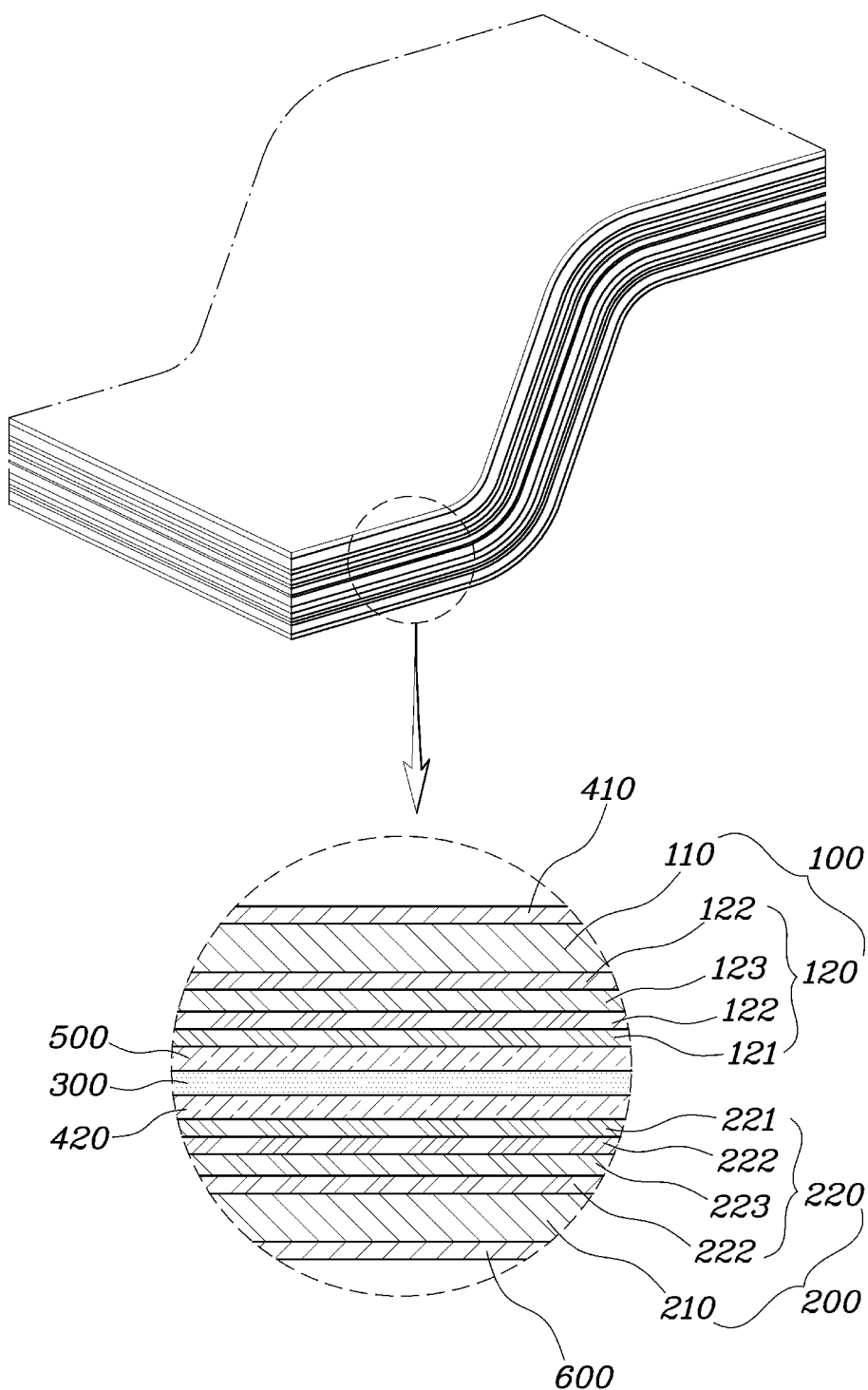
Figure 3:
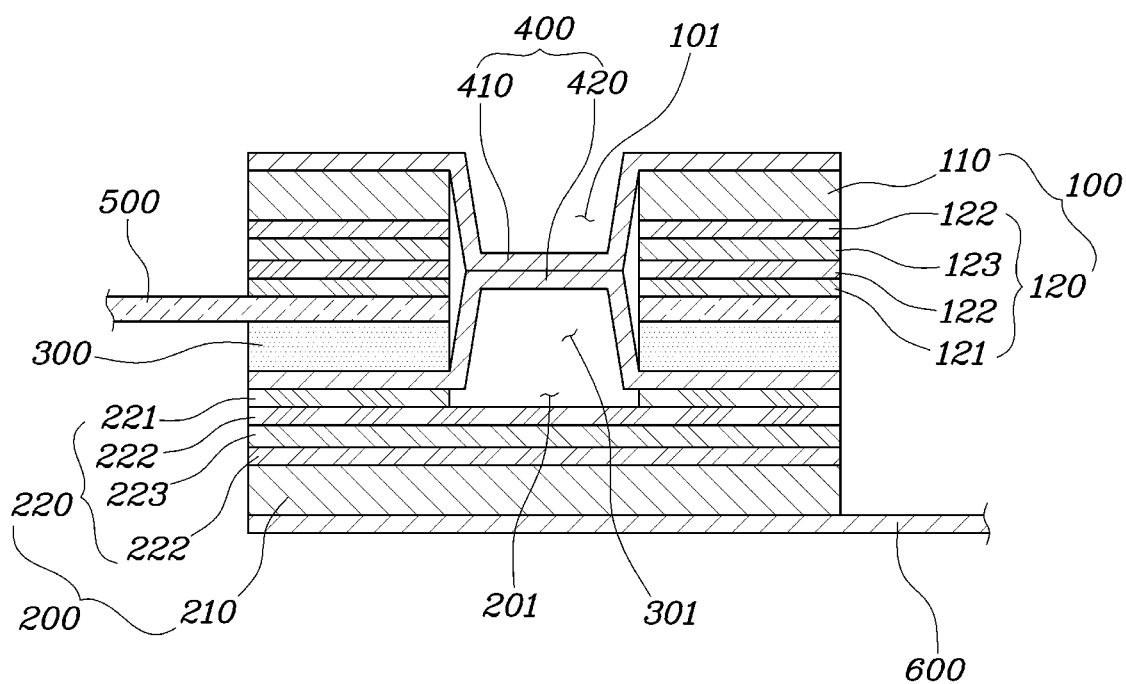
FIG. 3 is a cross-sectional view illustrating a vehicle body member having a charging and discharging function according to one embodiment of the present invention.
Figure 4A:
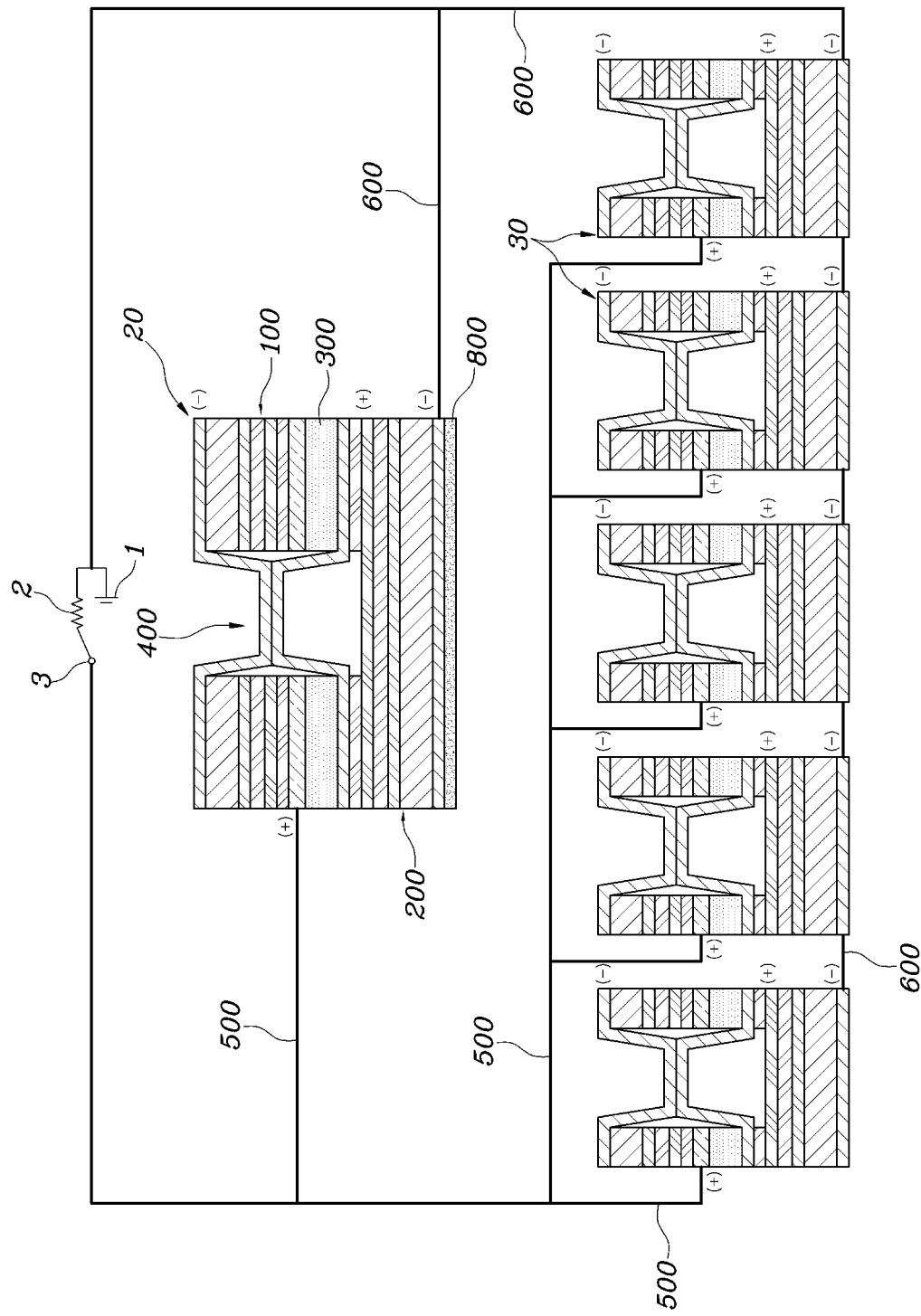
FIG. 4A is a series circuit diagram illustrating the vehicle body member having a charging and discharging function according to one embodiment of the present invention.

FIG. 1 is a perspective view illustrating a vehicle in which vehicle body members having a charging and discharging function according to embodiments of the present invention are used, FIGS. 2A and 2B are enlarged views illustrating key portions of FIG. 1, FIG. 3 is a cross-sectional view illustrating a vehicle body member having a charging and discharging function according to one embodiment of the present invention, FIG. 4A is a series circuit diagram illustrating the vehicle body member having a charging and discharging function according to one embodiment of the present invention, and FIG. 4B is a parallel circuit diagram illustrating the vehicle body member having a charging and discharging function according to one embodiment of the present invention.

Here, FIG. 2A is the enlargement of portion V1 in FIG. 1, while FIG. 2B is the enlargement of portion V2 in FIG. 1. In addition, FIG. 3 is the cross-sectional view taken along line a-a in FIG. 2A.

First, the vehicle body member having a charging and discharging function according to one embodiment of the present invention may be applied to a variety of components of which a vehicle body is composed. Hereinafter, roof members of a vehicle body, i.e. a roof panel and a roof rail, will be described as examples of the vehicle body member.

As illustrated in the drawings, a plurality of vehicle body members having a charging and discharging function according to one embodiment of the present invention is provided, such that at least one vehicle body member constitutes a roof panel 20 of a vehicle body 10, and the other vehicle body members constitute roof rails 30. Here, each of the vehicle body members constituting the roof panel 20 and the roof rails 30 serves as a secondary cell having a charging and discharging function.

In this regard, each of the vehicle body members 20 and 30 includes a first cell portion 100, a second cell portion 200, an insulating layer 300, a series connector 400, a positive pole current collector 500, and a negative pole current collector 600. The first cell portion 100 includes a first negative pole portion 110 made of carbon fiber and a first positive pole portion 120 disposed to be in contact with one surface of the first negative pole portion 110. The composition of the first positive pole portion 120 includes a cathode active material and a solid electrolyte. The second cell portion 200 includes a second negative pole portion 210 made of carbon fiber and a second positive pole portion 220 disposed to be in contact with the other surface of the second negative pole portion 210. The composition of the second positive pole portion 220 includes a cathode active material and a solid electrolyte. The insulating layer 300 is disposed between one surface of the first cell portion 100 and the other surface of the second cell portion 200 to insulate the first cell portion 100 and the second cell portion 200 from each other. The series connector 400 connects the first negative pole portion 110 of the first cell portion 100 and the second positive pole portion 220 of the second cell portion 200 in series. The positive pole current collector 500 is connected to the first positive pole portion 120 of the first cell portion 100. The negative pole current collector 600 is connected to the second negative pole portion 210 of the second cell portion 200. Accordingly, the first cell portion 100 and the second cell portion 200 are electrically connected to each other in series to increase charge and discharge outputs.

The first cell portion 100 is a means for constituting a single unit cell, and is comprised of the first negative pole portion 110 and the first positive pole portion 120.

Here, the first negative pole portion 110 is a strengthening means for reinforcing the strengths of the roof panel 20 and the roof rails 30 while defining the shapes of the roof panel 20 and the roof rails 30. According to the present embodiment, the first negative pole portion 110 also serves as a negative pole to perform a charging and discharging function. In this regard, the first negative pole portion 110 is made of carbon-based fiber to facilitate the oxidation and reduction of lithium ions.

Here, the first cell portion 100 may be provided by stacking a plurality of reinforced fiber sheets (including carbon fibers) arranged in different directions in order to enable strength reinforcement.

The first positive pole portion 120 may be a means for serving as a solid state separator as well as a positive pole for performing a charging and discharging function. The first positive pole portion 120 may be implemented by including a cathode active material used as a positive pole in a typical secondary cell. For example, the first positive pole portion 120 may include a lithium (Li) oxide. In addition, the first positive pole portion 120 may be implemented using a material used as a solid-phase electrolyte, i.e. a solid electrolyte, in a typical secondary cell.

For example, the first positive pole portion 120 may include a first positive pole layer 121 disposed opposite to one surface of the first negative pole portion 110, with the cathode active material being distributed in the first positive pole layer 121, and first solid electrolyte layers 122 disposed between the first negative pole portion 110 and the first positive pole layer 121 to be in contact with the first negative pole portion 110 and the first positive pole layer 121, respectively. Each of the first solid electrolyte layers 122 may be made of a solid electrolyte. Here, a first separator 123 separating the first negative pole portion 110 and the first positive pole layer 121 may further be disposed within the first solid electrolyte layers 122.

In addition, the first cell portion 100 has one or more via holes 101 penetrating the first negative pole portion 110 and the first positive pole portion 120. Specifically, the first cell portion 100 is provided with the first via holes 101 sequentially penetrating the first negative pole portion 110, the first solid electrolyte layers 122, with the first separator 123 being interposed between the first solid electrolyte layers 122, and the first positive pole layer 121.

In addition, like the first cell portion 100, the second cell portion 200 is a means for constituting a single unit cell, and is comprised of the second negative pole portion 210 and the second positive pole portion 220.

Here, the second negative pole portion 210 is a reinforcing means for reinforcing the strengths of the roof panel 20 and the roof rails 30, and also serves as a negative pole for performing a charging and discharging function according to the present embodiment. In this regard, the second negative pole portion 210 is made of carbon-based fiber to facilitate the oxidation and reduction of lithium ions.

Here, the second cell portion 200 may also be provided by stacking a plurality of reinforced fiber sheets (including carbon fibers) arranged in different directions in order to enable strength reinforcement.

The second positive pole portion 220 may be a means for serving as a solid state separator as well as a positive pole for performing a charging and discharging function. The second positive pole portion 220 may be implemented by including a cathode active material used as a positive pole in a typical secondary cell. For example, the second positive pole portion 220 may include a lithium (Li) oxide. In addition, the second positive pole portion 220 may be implemented using a material used as a solid-phase electrolyte, i.e. a solid electrolyte, in a typical secondary cell.

For example, the second positive pole portion 220 may include a second positive pole layer 221 disposed opposite to one surface of the second negative pole portion 210, with the cathode active material being distributed in the second positive pole layer 221, and second solid electrolyte layers 222 disposed between the second negative pole portion 210 and the second positive pole layer 221 to be in contact with the first negative pole portion 110 and the second positive pole layer 221, respectively. Each of the second solid electrolyte layers 222 may be made of a solid electrolyte. Here, a second separator 223 separating the second negative pole portion 210 and the second positive pole layer 221 may further be disposed within the second solid electrolyte layers 222.

In addition, the second cell portion 200 may have one or more second via holes 201 penetrating predetermined regions of the second negative pole portion 210 and the second positive pole portion 220. In the present embodiment, the second via holes 201 may be formed in minimum regions to communicate with the first via holes 101 in order to maintain the strength of the second cell portion 200. For example, the second via holes 201 may be provided only in the second positive pole layer 221 of the second positive pole portion 220. The second via holes 201 may be provided not only in the second positive pole layer 221 but also to penetrate all of the second solid electrolyte layers 222 (and the intervening second separator 223 if provided) and the second negative pole portion 210 of the second positive pole portion 220.

In addition, the first positive pole layer 121 and the second positive pole layer 221 are insulated from each other by the insulating layer 300. Accordingly, the first cell portion 100 and the second cell portion 200 are disposed on both sides of the insulating layer 300, respectively, such that an arrangement symmetrical with respect to the insulating layer 300 is provided.

Here, the insulating layer 300 has one or more insulating via holes 301 communicating with the first via holes 101. Here, the insulating via holes 301 may communicate with the second via holes 201.

In addition, in the present embodiment, the first cell portion 100 and the second cell portion 200, each of which constitutes a single unit cell, are electrically connected in series to increase a charging and discharging output.

In this regard, the series connector 400 serves to connect the first negative pole portion 110 of the first cell portion 100 and the second positive pole portion 220 of the second cell portion 200 in series via the first via holes 101 and the insulating via holes 301. More specifically, the series connector 400 connects the first negative pole portion 110 of the first cell portion 100 and the second positive pole layer 221 of the second cell portion 200 in series.

For example, the series connector 400 illustrated in FIG. 3 includes a first series connector 410 and a second series connector 420. The first series connector 410 is disposed to be in contact with the other surface of the first negative pole portion 110, and is bent to extend into the first via holes 101. The second series connector 420 is disposed to be sandwiched between the insulating layer 300 and the second positive pole layer 221, and is bent to extend into the insulating via holes 301 and the first via holes 101 to be in contact with the first series connector 410.

Accordingly, the first negative pole portion 110 of the first cell portion 100 and the first series connector 410 are electrically connected, the second positive pole layer 221 of the second cell portion 200 and the second series connector 420 are electrically connected, and the first series connector 410 and the second series connector 420 are electrically connected, such that the first cell portion 100 and the second cell portion 200 are electrically connected.

In addition, the positive pole current collector 500 is connected to the first positive pole layer 121 of which the first positive pole portion 120 of the first cell portion 100 is constituted, and the negative pole current collector 600 is connected to the second negative pole portion 210 of the second cell portion 200.

Here, the first cell portion 100, the second cell portion 200, the insulating layer 300, and the series connector 400 may be molded from a resin (not shown) having insulating property to be insulated externally while defining the shapes of the roof members 20 and 30.

In addition, in a case in which the first via holes 101, the second via holes 201, and the insulating via holes 301 are provided in the first cell portion 100, the second cell portion 200, and the insulating layer 300, respectively, a means for preventing the strength of a corresponding region from being reduced may further be provided.

For example, a reinforcing member 700 may be disposed in a portion or the entirety of each of the first via holes 101, the insulating via holes 301, and the second via holes 201.

Figure 5:
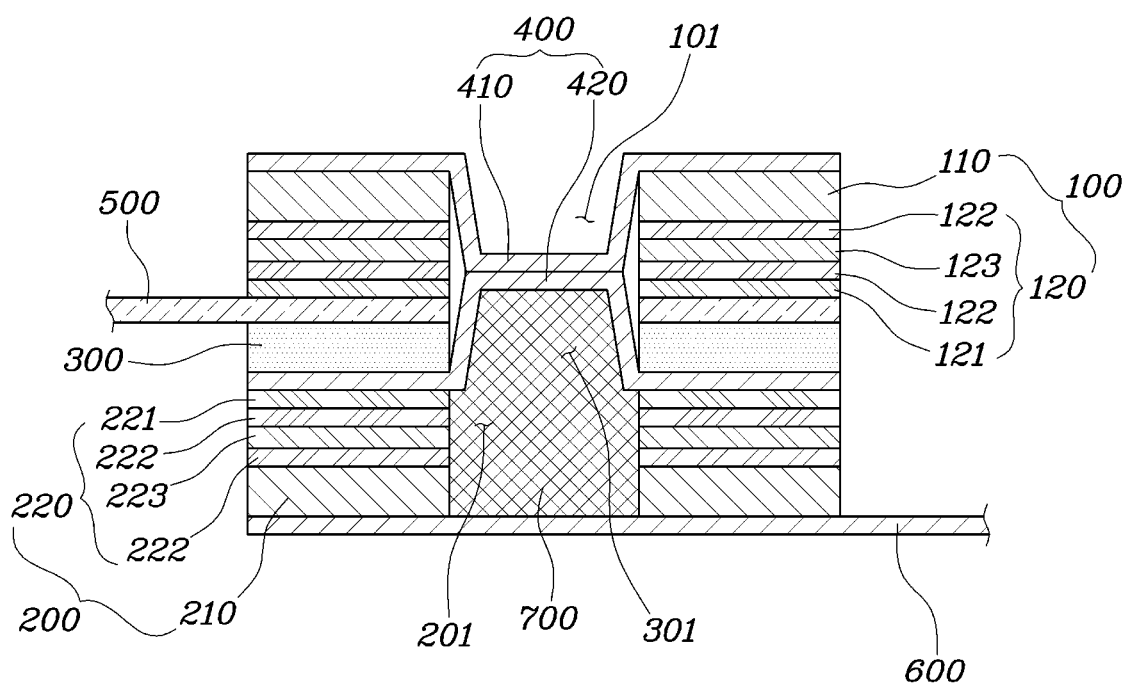
FIG. 5 illustrates a vehicle body member having a charging and discharging function according to another embodiment of the invention.

FIG. 5 illustrates a vehicle body member having a charging and discharging function according to another embodiment of the present invention. As illustrated in FIG. 5, the reinforcing member 700 may be disposed in a portion of each of the first via holes 101 and in the entirety of each of the insulating via holes 301 and the second via holes 201. Particularly, the reinforcing member 700 may be disposed in a space between the second series connector 420 and the negative pole current collector 600, among spaces in which the first via holes 101, the insulating via holes 301, and the second via holes 201 communicate, to protect the reinforcing member 700 and reinforce the strengths of the regions in which the first via holes 101, the second via holes 201, and the insulating via holes 301 are formed.

The reinforcing member 700 may be implemented using a variety of materials and into a variety of shapes. For example, the reinforcing member 700 may have a honeycomb structure to reinforce the strength while realizing a lightweight structure.

The roof members 20 and 30 of which the vehicle body 10 is constituted may typically include a single roof panel 20 and a plurality of roof rails 30.

Accordingly, as illustrated in FIG. 4A, in a case in which the roof members 20 and 30 include the single roof panel 20 and the plurality of roof rails 30, the positive pole current collector 500 of which the roof panel 20 is constituted and the positive pole current collector 500 of which each of the roof rails 30 is constituted are connected in parallel, while the negative pole current collector 600 of which the roof panel 20 is constituted and the negative pole current collector 600 of which each of the roof rails 30 is constituted are connected in parallel.

In this manner, the roof panel 20 and the roof rails 30 may be connected in parallel to increase the capacity of a secondary cell.

In addition, the positive pole current collector 500 and the negative pole current collector 600 are selectively connected to an alternator 1 or an electromagnetic device 2 of a vehicle via a switch 3.

Accordingly, while the positive pole current collector 500 and the negative pole current collector 600 are electrically connected to the alternator 1 of the vehicle, a charging operation is performed via the roof panel 20 and the roof rails 30. While the positive pole current collector 500 and the negative pole current collector 600 are electrically connected to the electromagnetic device 2 of the vehicle, power generated by a discharging operation performed via the roof panel 20 and the roof rails 30 is supplied to the electromagnetic device 2 of the vehicle.

Here, the electromagnetic device 2 is a component provided in the vehicle to be operable in response to the supply of power. For example, the electromagnetic device 2 may correspond to a variety of indoor lamps, such as a room lamp.

In addition, in the roof members comprised of the roof panel 20 and the plurality of roof rails 30, the plurality of roof rails 30 are spaced apart from each other at equal distances and the roof panel 20 is disposed on top of the plurality of roof rails 30, in consideration of the structure of the vehicle body 10. Thus, an insulating member 800 may be disposed between the plurality of roof rails 30 and the roof panel 20 to provide mutual insulation.

In addition, as illustrated in FIG. 4B, in a case in which the roof members 20 and 30 are comprised of the single roof panel 20 and the plurality of roof rails 30, the positive pole current collector 500 connected to the first positive pole layer 121 of each of the roof rails 30 may be connected in series to the negative pole current collector 600 connected to the second negative pole portion 210 of the other roof member 30, thereby connecting the roof rails 30 in series.

When the plurality of roof rails 30 is connected in series as described above, the output of the secondary cell may be increased.

In addition, the positive pole current collector 500 of the roof rail 30, disposed on one end of the roof rails 30 connected in series, and the negative pole current collector 600 of the roof rail 30, disposed on the other end of the roof rails 30 connected in series, are selectively connected to the alternator 1 or the electromagnetic device 2 of the vehicle via the switch 3.

In addition, the positive pole current collector 500 connected to the first positive pole layer 121 of the roof panel 20 may be connected in parallel to the positive pole current collector 500 of the roof rail 30, disposed on one end of the roof rails 30 connected in series, while the negative pole current collector 600 connected to the first negative pole portion 110 of the roof panel 20 may be connected in parallel to the negative pole current collector 600 of the roof rail 30, disposed on the other end of the roof rails 30 connected in series. Although the plurality of roof rails 30 connected in series and the roof panel 20 may be electrically connected in parallel, the plurality of roof rails 30 and the roof panel 20 may be electrically connected in series to further increase the output of charging and discharging.

The roof panel 20 and the plurality of roof rails 30 electrically connected in this manner are electrically connected to the alternator 1 and the electromagnetic device 2 of the vehicle in the same manner as in the above-described embodiment.

For example, while the positive pole current collector 500 of the roof rail 30, disposed on one end of the plurality of roof rails 30 connected in series, and the negative pole current collector 600 of the roof rail 30, disposed on the other end of the plurality of roof rails 30 connected in series, are electrically connected to the alternator 1 of the vehicle, a charging operation is performed via the roof panel 20 and the roof rails 30. In addition, while the positive pole current collector 500 of the roof rail 30, disposed on one end of the plurality of roof rails 30 connected in series, and the negative pole current collector 600 of the roof rail 30, disposed on the other end of the plurality of roof rails 30 connected in series, are connected to the electromagnetic device 2 of the vehicle, power generated by a discharging operation performed via the roof panel 20 and the roof rails 30 is supplied to the electromagnetic device 2 of the vehicle.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A vehicle body member having a charging and discharging function, the vehicle body member comprising:
   a first cell portion including a first negative pole portion made of carbon fiber and a first positive pole portion disposed to be in contact with a surface of the first negative pole portion, the first positive pole portion including a first cathode active material and a first solid electrolyte, with one or more first via holes penetrating the first negative pole portion and the first positive pole portion;
   a second cell portion including a second negative pole portion made of carbon fiber and a second positive pole portion disposed to be in contact with a surface of the second negative pole portion, the second positive pole portion including a second cathode active material and a second solid electrolyte;
   an insulating layer disposed between a surface of the first cell portion and a surface of the second cell portion and configured to insulate the first cell portion and the second cell portion from each other, the insulating layer having one or more insulating via holes configured to communicate with the first via holes provided in the first cell portion;
   a reinforcing member disposed in at least a portion of the one or more first via holes, the one or more insulating via holes, and one or more second via holes;
   a series connector connecting the first negative pole portion of the first cell portion and the second positive pole portion of the second cell portion in series via the first via holes and the insulating via holes;
   a positive pole current collector connected to the first positive pole portion of the first cell portion; and
   a negative pole current collector connected to the second negative pole portion of the second cell portion.

2. The vehicle body member according to claim 1, wherein each of the first negative pole portion and the second negative pole portion comprises a stack of a plurality of reinforced fiber sheets having carbon fibers arranged in different directions.

3. The vehicle body member according to claim 1, wherein the first positive pole portion comprises a first positive pole layer with the first cathode active material being distributed in the first positive pole layer, and first solid electrolyte layers disposed between the first negative pole portion and the first positive pole layer, one of the first solid electrolyte layers in contact with the first negative pole portion and another one of the first solid electrolyte layers in contact with the first positive pole layer;
   the second positive pole portion comprises a second positive pole layer with the second cathode active material being distributed in the second positive pole layer, and second solid electrolyte layers disposed between the second negative pole portion and the second positive pole layer, one of the second solid electrolyte layers in contact with the second negative pole portion and another one of the second solid electrolyte layers in contact with the second positive pole layer;
   the first positive pole layer and the second positive pole layer are insulated from each other by the insulating layer; and
   the second positive pole layer and the first negative pole portion are connected in series via the series connector.

4. The vehicle body member according to claim 3, wherein the series connector comprises:
   a first series connector disposed to be in contact with the first negative pole portion and bent to extend into the first via holes; and
   a second series connector disposed to be sandwiched between the insulating layer and the second positive pole layer and bent to extend into the insulating via holes and the first via holes to be in contact with the first series connector.

5. The vehicle body member according to claim 1, wherein the second cell portion comprises the one or more second via holes, the one or more second via holes penetrating predetermined regions of the second negative pole portion and the second positive pole portion, and the second via holes being provided in locations configured to communicate with locations in which the first via holes are provided.

6. The vehicle body member according to claim 1, wherein the vehicle body member comprises a plurality of vehicle body members, and wherein:
the positive pole current collectors of the vehicle body members are connected in parallel;
the negative pole current collectors of the vehicle body members are connected in parallel; and
the positive pole current collectors and the negative pole current collectors are selectively connected to an alternator or an electromagnetic device of a vehicle via a switch.

7. The vehicle body member according to claim 6, wherein the switch is configured to selectively connect to the alternator or the electromagnetic device to perform one of:
a charging operation performed via the vehicle body members while the positive pole current collectors and the negative pole current collectors are electrically connected to the alternator of the vehicle; and
a discharging operation performed to generate power via the vehicle body members connected to the electromagnetic device of the vehicle while the positive pole current collectors and the negative pole current collectors are electrically connected to the electromagnetic device of the vehicle.

8. The vehicle body member according to claim 6, wherein at least one vehicle body member of the plurality of vehicle body members provides a roof panel of the vehicle, and other vehicle body members of the plurality of vehicle body members provide roof rails of the vehicle.

9. The vehicle body member according to claim 8, wherein the vehicle body member providing the roof panel and the vehicle body members providing the roof rails are insulated by an insulating member.

10. The vehicle body member according to claim 1, wherein the vehicle body member comprises a plurality of vehicle body members, and wherein:
the positive pole current collectors respectively connected to a corresponding one of first positive pole layers of the vehicle body members are connected in series with the negative pole current collectors respectively connected to a corresponding one of the second negative pole portions of an adjacent vehicle body member, such that the positive pole current collectors are connected to each other in series; and
the positive pole current collector of a vehicle body member disposed on a first end of the vehicle body members connected in series, and the negative pole current collector of a vehicle body member disposed on a second end of the vehicle body members connected in series, are selectively connected to an alternator or an electromagnetic device of a vehicle via a switch.

11. The vehicle body member according to claim 10, wherein the switch is configured to selectively connect to the alternator or the electromagnetic device to perform one of:
a charging operation performed via the vehicle body members while the positive pole current collectors and the negative pole current collectors are electrically connected to the alternator of the vehicle; and
a discharging operation performed to generate power via the vehicle body members connected to the electromagnetic device of the vehicle while the positive pole current collectors and the negative pole current collectors are electrically connected to the electromagnetic device of the vehicle.

12. The vehicle body member according to claim 10, wherein:
at least one vehicle body member of the plurality of vehicle body members provides a roof panel of the vehicle, and other vehicle body members of the plurality of vehicle body members provide roof rails of the vehicle; and
the vehicle body member providing the roof panel and the vehicle body members providing the roof rails are insulated by an insulating member.

13. The vehicle body member according to claim 1, wherein the first cell portion, the second cell portion, the insulating layer, and the series connector are molded from a resin.

14. A vehicle comprising:
a vehicle body; and
a plurality if vehicle body members attached to the vehicle body, each of the vehicle body members comprising:
a first cell portion including a first negative pole portion made of carbon fiber and a first positive pole portion disposed to be in contact with a surface of the first negative pole portion, the first positive pole portion including a first cathode active material and a first solid electrolyte, with one or more first via holes penetrating the first negative pole portion and the first positive pole portion;
a second cell portion including a second negative pole portion made of carbon fiber and a second positive pole portion disposed to be in contact with a surface of the second negative pole portion, the second positive pole portion including a second cathode active material and a second solid electrolyte;
an insulating layer disposed between a surface of the first cell portion and a surface of the second cell portion and configured to insulate the first cell portion and the second cell portion from each other, the insulating layer having one or more insulating via holes configured to communicate with the first via holes provided in the first cell portion;
a reinforcing member disposed in at least a portion of the one or more first via holes, the one or more insulating via holes, and one or more second via holes;
a series connector connecting the first negative pole portion of the first cell portion and the second positive pole portion of the second cell portion in series via the first via holes and the insulating via holes;
a positive pole current collector connected to the first positive pole portion of the first cell portion; and
a negative pole current collector connected to the second negative pole portion of the second cell portion.

15. The vehicle according to claim 14, wherein the first positive pole portion comprises a first positive pole layer with the first cathode active material being distributed in the first positive pole layer, and first solid electrolyte layers disposed between the first negative pole portion and the first positive pole layer, one of the first solid electrolyte layers in contact with the first negative pole portion and another one of the first solid electrolyte layers in contact with the first positive pole layer;
the second positive pole portion comprises a second positive pole layer with the second cathode active material being distributed in the second positive pole layer, and second solid electrolyte layers disposed between the second negative pole portion and the second positive pole layer, one of the second solid electrolyte layers in contact with the second negative pole portion and another one of the second solid electrolyte layers in contact with the second positive pole layer;

the first positive pole layer and the second positive pole layer are insulated from each other by the insulating layer; and the second positive pole layer and the first negative pole portion are connected in series via the series connector.

16. The vehicle according to claim 15, wherein the series connector comprises:
   a first series connector disposed to be in contact with the first negative pole portion and bent to extend into the first via holes; and
   a second series connector disposed to be sandwiched between the insulating layer and the second positive pole layer and bent to extend into the insulating via holes and the first via holes to be in contact with the first series connector.

17. The vehicle according to claim 14, wherein:
   the second cell portion comprises the one or more second via holes, the one or more second via holes penetrating predetermined regions of the second negative pole portion and the second positive pole portion, and the second via holes being provided in locations configured to communicate with locations in which the first via holes are provided.

18. The vehicle according to claim 14, wherein:
   the positive pole current collectors of the vehicle body members are connected in parallel, the negative pole current collectors of the vehicle body members are connected in parallel, and the positive pole current collectors and the negative pole current collectors are selectively connected to an alternator or an electromagnetic device of the vehicle via a switch; or
   the positive pole current collectors respectively connected to a corresponding one of first positive pole layers of the vehicle body members are connected in series to the negative pole current collectors respectively connected to a corresponding one of the second negative pole portions of the other vehicle body member, such that the positive pole current collectors are connected to each other in series, and the positive pole current collector of a vehicle body member disposed on a first end of the vehicle body members connected in series, and the negative pole current collector of a vehicle body member disposed on a second end of the vehicle body members connected in series, are selectively connected to the alternator or the electromagnetic device of the vehicle via the switch.

19. The vehicle according to claim 18, wherein the switch is configured to selectively connect to the alternator or the electromagnetic device to perform one of:
   a charging operation performed via the vehicle body members while the positive pole current collectors and the negative pole current collectors are electrically connected to the alternator of the vehicle; and
   a discharging operation performed to generate power via the vehicle body members connected to the electromagnetic device of the vehicle while the positive pole current collectors and the negative pole current collectors are electrically connected to the electromagnetic device of the vehicle.

* * * * *